(12) United States Patent
Chen et al.

(10) Patent No.: US 9,252,610 B2
(45) Date of Patent: Feb. 2, 2016

(54) POWER CHARGING SOCKET

(71) Applicants:Shih Chung Chen, Hsin Chuang (TW); Shu-Mu Chen, Hsin Chuang (TW)

(72) Inventors: Shih Chung Chen, Hsin Chuang (TW); Shu-Mu Chen, Hsin Chuang (TW)

(73) Assignee: Youhua Technology (Shenzhen) Co., Ltd., Shenzhen (CN)

( * ) Notice: Subject to any disclaimer, the term of this patent is extended or adjusted under 35 U.S.C. 154(b) by 125 days.

(21) Appl. No.: 14/159,463

(22) Filed: Jan. 21, 2014

(65) Prior Publication Data
US 2015/0207350 A1    Jul. 23, 2015

(51) Int. Cl.
*H02J 7/00* (2006.01)
(52) U.S. Cl.
CPC .................................... *H02J 7/0042* (2013.01)
(58) Field of Classification Search
CPC . H02J 7/025; H02J 2007/0062; H02J 7/0052; H02J 7/0027
USPC ......................................................... 320/111
See application file for complete search history.

(56) References Cited

U.S. PATENT DOCUMENTS

| | | | | |
|---|---|---|---|---|
| 2010/0029109 | A1* | 2/2010 | Lam et al. | 439/136 |
| 2011/0287665 | A1* | 11/2011 | Chien | 439/638 |
| 2012/0292991 | A1* | 11/2012 | Dodal et al. | 307/11 |
| 2013/0207472 | A1* | 8/2013 | Chiang | 307/48 |
| 2013/0257363 | A1* | 10/2013 | Lota et al. | 320/108 |
| 2013/0267116 | A1* | 10/2013 | Tin | 439/535 |
| 2015/0129722 | A1* | 5/2015 | Green | 248/51 |
| 2015/0145272 | A1* | 5/2015 | Cleary et al. | 296/37.16 |
| 2015/0167957 | A1* | 6/2015 | Chien | 362/20 |
| 2015/0263447 | A1* | 9/2015 | Liao | 320/108 |
| 2015/0320209 | A1* | 11/2015 | Hasselback et al. | 320/108 |

* cited by examiner

*Primary Examiner* — Suchin Parihar
(74) *Attorney, Agent, or Firm* — Garcia-Zamor IP Law; Ruy M. Garcia-Zamor

(57) ABSTRACT

A power charging socket according to an exemplary embodiment of the disclosure is inlaid in a supporting body. The power charging socket includes a power socket module and a panel. The power socket module includes a power port exposed out of the panel. The power charging socket further includes a USB charging module and a baffle plate. The USB charging module includes a charging port exposed out of the panel. A wireless charging transmitter is located inside the baffle plate. One end of the baffle plate is rotatably connected with a bottom of the panel, and another end of the baffle plate is detachably connected with the panel. The baffle plate closes the panel to cover the power port and the charging port.

8 Claims, 6 Drawing Sheets

POWER CHARGING SOCKET

BACKGROUND

1. Technical Field

The present disclosure generally relates to sockets, and especially to a power charging socket for charging a storage battery of an electronic device directly.

2. Description of Related Art

With rapid development of electronic technology, most of portable electronic devices, such as smart mobile phones, digital cameras, portable chargers and Global Position Systems (GPS) have brought great convenience to people's daily life, and becomes more and more popular with consumers. When the electronic devices require battery charging, chargers corresponding to the electronic devices are generally required to insert into a standard power socket, and then the electronic devices are connected with the chargers. However, when the consumers go out, it is necessary for the consumers to carry on the chargers for battery charging of the electronic devices, due to the storage capacity of batteries embedded in the electronic devices cannot maintain the use of the electronic devices for a long time. As a result, when the consumers go out, the consumers are generally required to carry on the chargers for battery charging of the electronic devices, which results inconvenience for the consumers.

Therefore, a need exists in the industry to overcome the described problems.

SUMMARY

The disclosure is to offer a power charging socket, when consumers go out, the consumers can carry out battery charging for electronic devices without requirements for carrying chargers.

The power charging socket according to an exemplary embodiment of the disclosure is inlaid in a supporting body. The power charging socket includes a power socket module and a panel. The power socket module includes a power port exposed out of the panel. The power charging socket further includes a USB charging module and a baffle plate. The USB charging module includes a charging port exposed out of the panel. A wireless charging transmitter is located inside the baffle plate, One end of the baffle plate is rotatably connected with a bottom of the panel, and another end of the baffle plate is detachably connected with the panel. The baffle plate closes the panel to cover the power port and the charging port.

Preferably, the power charging socket further includes a frame inlaid in the supporting body. The power socket module and the USB charging module are fixed with the frame, and the panel is inlaid in the supporting body to fix with the frame.

Preferably, the charging socket further includes a cover inlaid in the supporting body. The frame covers an open end of the cover, and ends of the power socket module and the USB charging module far away the frame extend into the cover.

Preferably, the frame includes a first baseboard defining a first positioning hole, and a first rim perpendicularly extending from edges of the first baseboard. The power socket module and the USB charging module are positioned at the first positioning hole, and the first rim inserts into the panel to fix with the panel.

Preferably, the panel includes a second baseboard defining a second positioning hole, and a second rim perpendicularly extending from edges of the second baseboard. The second rim encapsulates the first rim of the frame, and the power port and the charging port pass through the second positioning hole to expose out of the panel.

Preferably, the first baseboard defines a plurality of latching slots. The second baseboard includes a plurality of hooks corresponding to the plurality of latching slots. The plurality of hooks latch into the plurality of latching slots, respectively, to fix the panel with the frame.

Preferably, the frame includes a sub-frame extending from edges of the first positioning hole and toward the panel. The power socket module and the USB charging module are fixed in the sub-frame.

Preferably, the charging port is a USB interface.

It follows that, the power charging socket of the disclosure employs the USB charging module to install on a standard power socket. When the consumers go out and especially forget to carry chargers, the electronic devices are directly inserted into the power charging socket to carry out battery charging without connection with a charger, which gets rid of trouble for the consumers to carry chargers.

In addition, the power charging socket of the disclosure employs the baffle plate to be rotatably connected with the panel of the power charging socket, and configures the wireless charging transmitter inside the baffle plate. The baffle plate not only supports the electronic device requiring battery charging, but also if the electronic device has a wireless charging receiver, the electronic device carries out battery charging as long as the electronic device is laid on the baffle plate. Therefore, the electronic device embedded the wireless charging receiver can carry out battery charging without data cables, which results of great convenience for the consumers.

Furthermore, when the electronic device finishes battery charging, the baffle plate closes the panel to cover the charging port and the power port, which prevents electric shock effectively, and improves the safety of the power charging socket.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
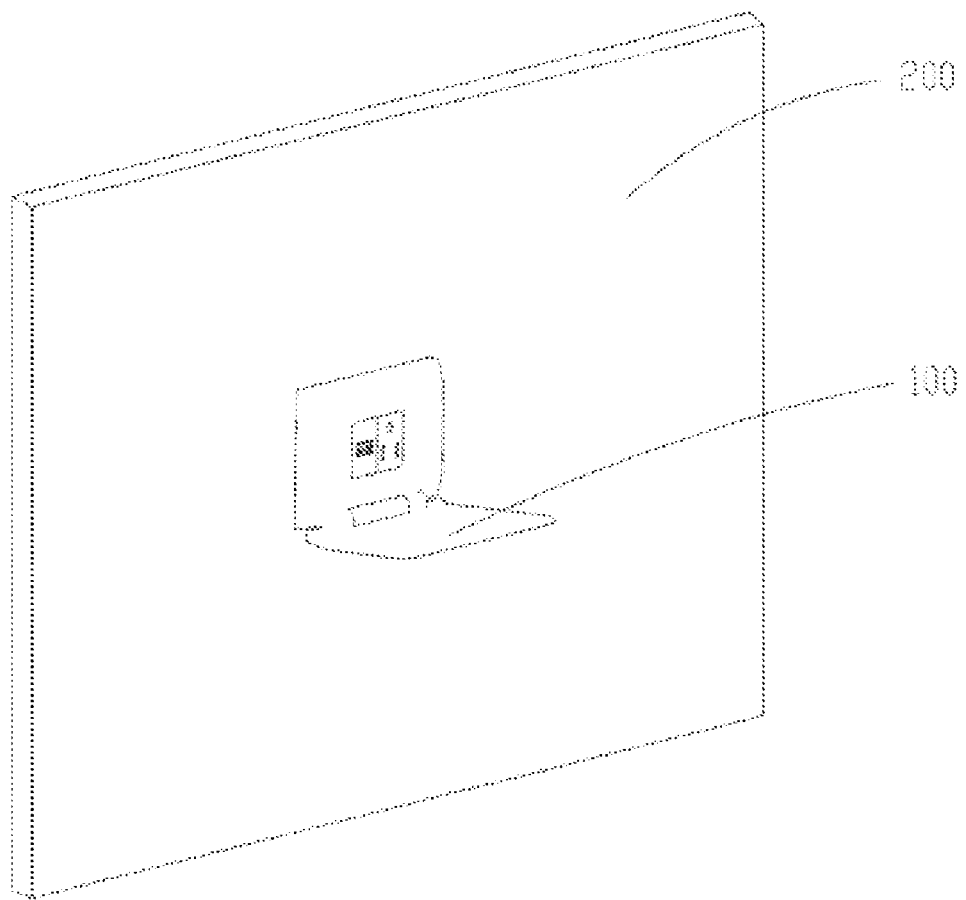
FIG. 1 is an assembled view of a power charging socket inlaid in a supporting body, wherein a baffle board of the power charging socket opens.

The disclosure is illustrated by way of example and not by way of limitation in the figures of the accompanying drawings, in which like reference numerals indicate similar elements. It should be noted that references to "an" or "one"

embodiment in this disclosure are not necessarily to the same embodiment, and such references can mean "at least one" embodiment.

Figure 2:
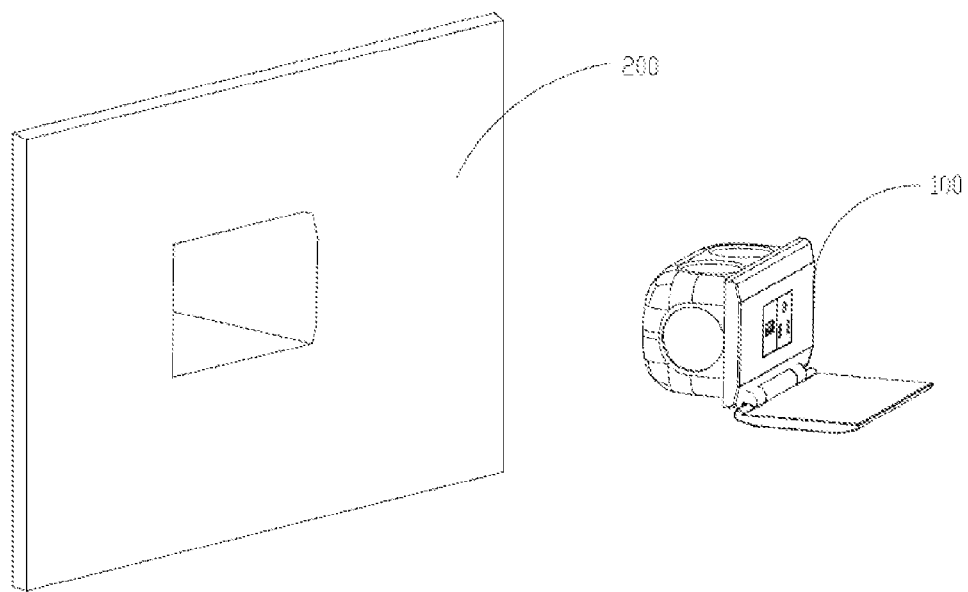
FIG. 2 is a disassembled view of the power charging socket and the supporting body of FIG. 1.
Figure 3:
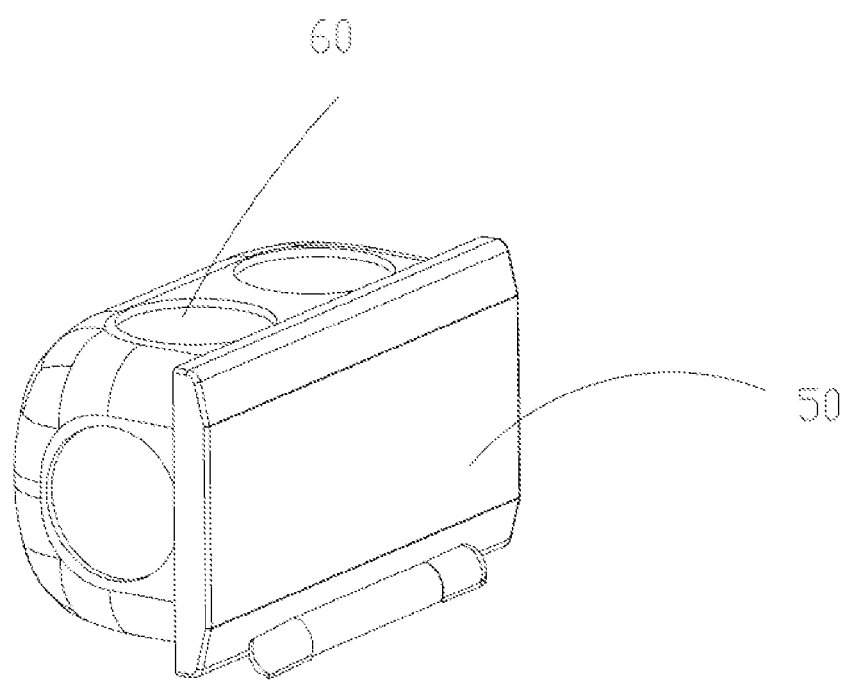
FIG. 3 is an assembled view of the power charging socket of FIG. 2, wherein the baffle board of the power charging socket closes a panel of the power charging socket.
Figure 4:
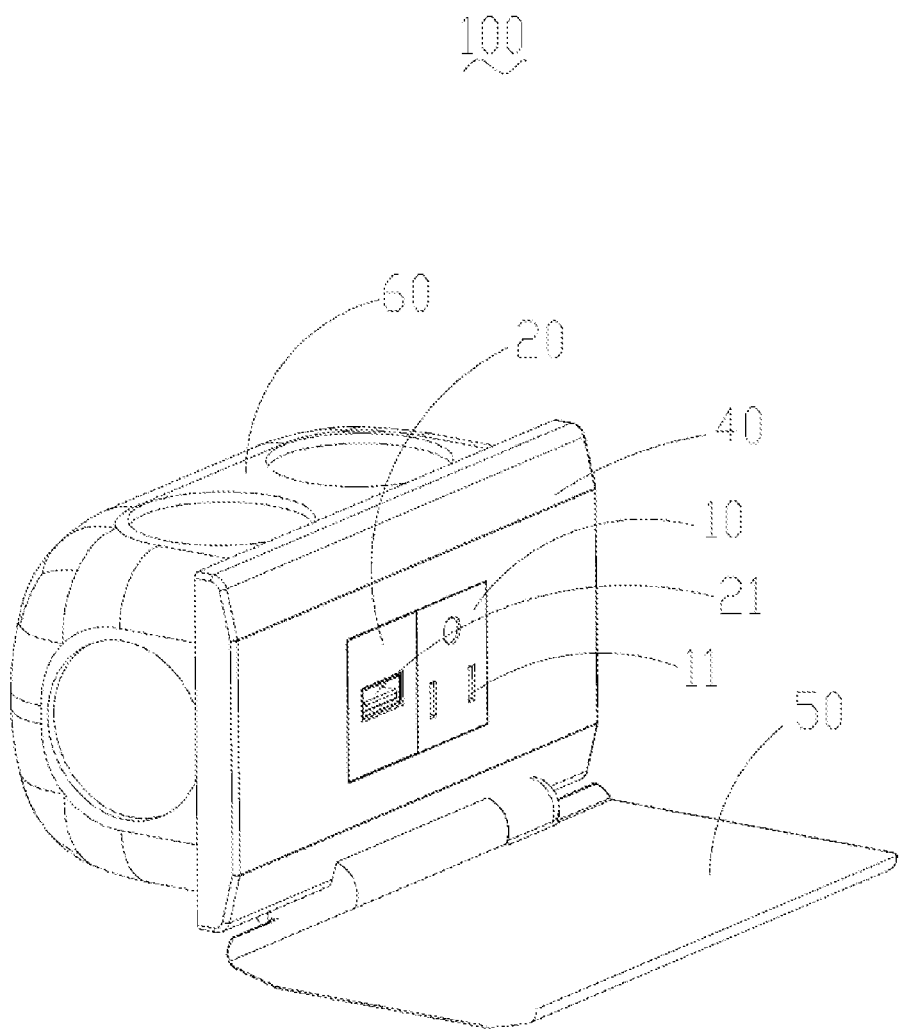
FIG. 4 is another assembled view of the power charging socket of FIG. 2, wherein the baffle board opens.
Figure 5:
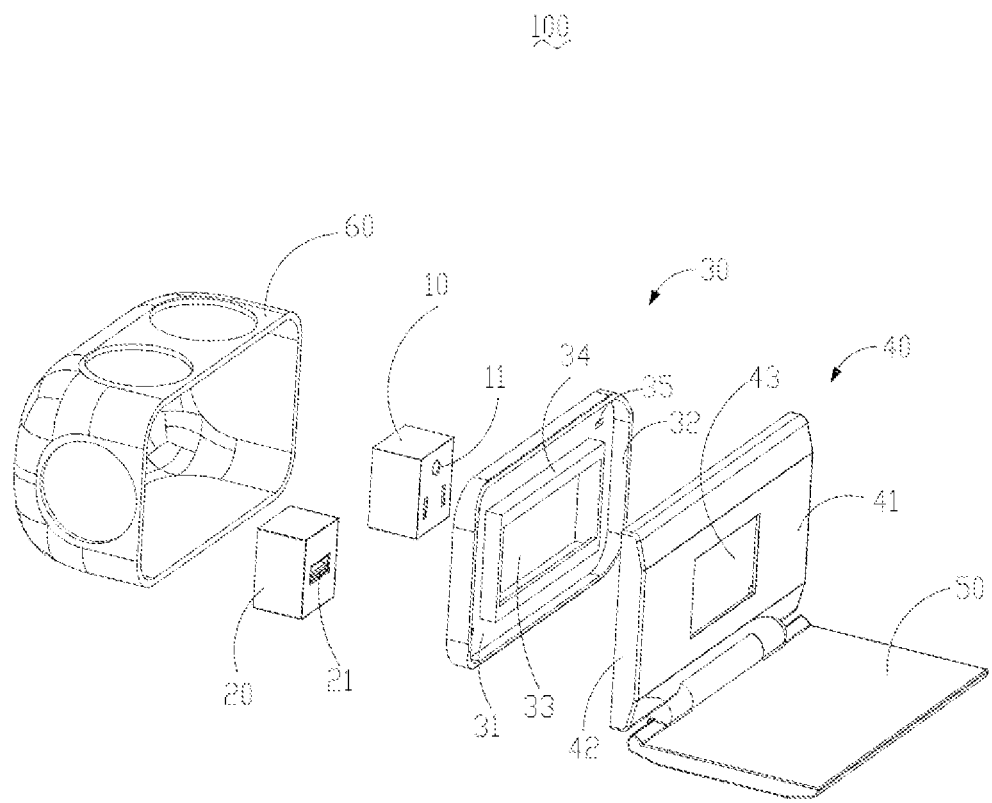
FIG. 5 is a disassembled view of the power charging socket of FIG. 4.
Figure 6:
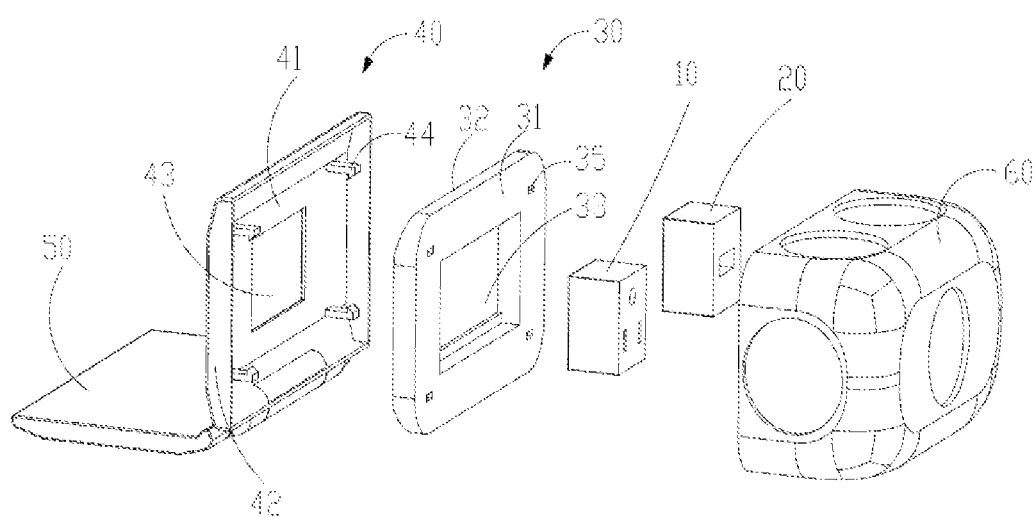
FIG. 6 is same as FIG. 5, but viewed from another view.

With reference to FIGS. 1-6, the power charging socket 100 of the disclosure is inlaid in a supporting body 200. The power charging socket 100 includes a power socket module. 10, a USB charging module 20, a panel 40 and a baffle board 50. The power socket module 10 includes a power port 11 exposed out of the panel 40. The USB charging module 20 includes a charging port 21 exposed out of the panel 40. A wireless charging transmitter is located inside the baffle board 50. One end of the baffle board 50 is rotatably connected with a bottom of the panel 40, and another end of the baffle board 50 is detachably connected with the panel 40. The baffle board 50 closes the panel 40 to cover the power port 11 and the charging port 21.

When the power charging socket 100 is not used, the baffle board 50 closes the panel 40 to cover the power port 11 and the charging port 21, which effectively prevents children touching the power port 11 and the charging port 21 to get electrical shock. When the electronic device requires battery charging, the other end of the baffle board 50 detaches from the panel 40. The electronic device carries out battery charging as long as the electronic device is laid on the baffle board 50, and a data cable is connected between the charging port 21 and the electronic device. As a result, the baffle board 50 is configured to support the electronic device to protect the electronic device from damaging.

If the electronic device has a wireless charging receiver, the electronic device carries out battery charging as long as the baffle board 50 opens, and the electronic device is laid on the baffle board 50.

It follow that, the power charging socket 100 of the disclosure employs the USB charging module 20 to install on a standard power socket. When the consumers go out and especially forget to carry chargers, the electronic devices are directly inserted into the power charging socket 100 to carry out battery charging without connection with a charger, which gets rid of trouble for the consumers to carry chargers.

In addition, the power charging socket 100 of the disclosure employs a baffle plate 50 to be rotatably connected with the panel 40 of the power charging socket 100, and configures the wireless charging transmitter inside the baffle plate 50. The baffle plate 50 not only supports the electronic device requiring battery charging, but also if the electronic device has a wireless charging receiver, the electronic device carries out battery charging as long as the electronic device is laid on the baffle plate 50. Therefore, the electronic device embedded the wireless charging receiver can carry out battery charging without the data cable, which results of great convenience for the consumers.

Furthermore, when the electronic device finishes battery charging, the baffle plate 50 closes the panel 40 to cover the charging port 21 and the power port 11, which prevents electric shock effectively, and improves the safety of the power charging socket 100.

In the embodiment, the supporting body 200 is interior walls in a room. Alternatively, the supporting body 200 may be a desktop. The power port 11 is configured for connecting exterior power plugs, and may be in the form of insertion holes in any shape or electrical connectors. The USB charging module 20 is configured for directly carrying out battery charging for the electronic device, and is equivalent to the charger corresponding to the electronic device. The charging port 21 is a USB interface. The electronic device carries out battery charging as long as a USB date cable is connected between the charging port 21 and the electronic device. If the electronic device with the wireless charging receiver, the electronic device carries out battery charging as long as the electronic device is laid on the baffle board 50 of the power charging socket 100.

The size of the power charging socket 100 of the disclosure is same as that of the standard power socket inlaid in the interior wall in the room. So that, the power charging socket 100 of the disclosure can be mounted in the interior wall when the room is decorated. Of course, it is feasible to use the panel 40 with the rotably baffle board 50 instead of a panel of the existing standard power socket.

In the embodiment, the baffle board 50 is rotatably connected with the bottom of the panel 40 by hinges. Alternatively, the baffle board 50 is rotatably connected with the bottom of the panel 40 by way of engagement of shafts and shaft holes.

In the embodiment, the power charging socket 100 further includes a frame 30 and a housing 60 inlaid in the supporting body 200. In assembly, the power socket module 10 and the USB charging module 20 are positioned at the frame 30. Ends of the power socket module 10 and the USB charging module 20 far away the frame 30 extend into the housing 60. The frame 30 covers an open end of the housing 60. The panel 40 is inlaid in the supporting body 200, and fixed with the frame 30.

In detail, the frame 30 includes a first baseboard 31 defining a first positioning hole 33, and a first rim 32 perpendicularly extending from edges of the first baseboard 31. In assembly, the power socket module 10 and the USB charging module 20 are positioned at the first positioning hole 33, and the first rim 32 inserts into the panel 40 to fix with the panel 40.

The panel 40 includes a second baseboard 41 defining a second positioning hole 43, and a second rim 42 perpendicularly extending from edges of the second baseboard 41. In assembly, the second rim 42 encapsulates the first rim 32 of the frame 30, and the power port 11 and the charging port 21 pass through the second positioning hole 43 to expose out of the panel 40.

In the embodiment, the first baseboard 31 defines a plurality of latching slots 35, and the second baseboard 41 includes a plurality of hooks 44 corresponding to the plurality of latching slots 35. In assembly, the plurality of hooks 44 latch into the plurality of latching slots 35, respectively, to fix the panel 40 with the frame 30.

Further, the frame 30 includes a sub-frame 34 extending from edges of the first positioning hole 33 and toward the panel 40. In assembly, the power socket module 10 and the USB charging module 20 are fixed in the sub-frame 34.

In use, when the electronic device requires battery charging, the baffle board 50 is opened, and the electronic device is laid on the baffle board 50. One end of the data cable is inserted into a charging port of the electronic device, and another end of the data cable is inserted into the charging port 21 of the USB charging module 20 of the power charging socket 100. If the electronic device has the wireless charging receiver, the electronic device carries out battery charging as long as the electronic device is laid on the baffle board 50. When the electronic device finishes battery charging, the baffle board 50 closes to cover the panel 40.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A power charging socket inlaid in a supporting body, the power charging socket comprising a power socket module and a panel, the power socket module comprising a power port exposed out of the panel, wherein the power charging socket further comprises a USB charging module and a baffle plate, the USB charging module comprises a charging port exposed out of the panel, a wireless charging transmitter is located inside the baffle plate, one end of the baffle plate is rotatably connected with a bottom of the panel, and another end of the baffle plate is detachably connected with the panel, the baffle plate closes the panel to cover the power port and the charging port.

2. The power charging socket of claim 1, further comprising a frame inlaid in the supporting body, and wherein the power socket module and the USB charging module are fixed with the frame, and the panel is inlaid in the supporting body to fix with the frame.

3. The power charging socket of claim 2, wherein the charging socket further comprises a cover inlaid in the supporting body, and the frame covers an open end of the cover, and ends of the power socket module and the USB charging module far away the frame extend into the cover.

4. The power charging socket of claim 2, wherein the frame comprises a first baseboard defining a first positioning hole, and a first rim perpendicularly extending from edges of the first baseboard, the power socket module and the USB charging module are positioned at the first positioning hole, and the first rim inserts into the panel to fix with the panel.

5. The power charging socket of claim 4, wherein the panel comprises a second baseboard defining a second positioning hole, and a second rim perpendicularly extending from edges of the second baseboard, the second rim encapsulates the first rim of the frame, and the power port and the charging port pass through the second positioning hole to expose out of the panel.

6. The power charging socket of claim 5, wherein the first baseboard defines a plurality of latching slots, and the second baseboard comprises a plurality of hooks corresponding to the plurality of latching slots, the plurality of hooks latch into the plurality of latching slots, respectively, to fix the panel with the frame.

7. The power charging socket of claim 6, wherein the frame comprises a sub-frame extending from edges of the first positioning hole and toward the panel, the power socket module and the USB charging module are fixed in the sub-frame.

8. The power charging socket of claim 1, wherein the charging port is a USB interface.

* * * * *